United States Patent Office 3,522,298
Patented July 28, 1970

3,522,298
TEREPHTHALIC ACID PURIFICATION PROCESS
Howard S. Bryant, Jr., New York, N.Y., Claiborne A. Duval, Jr., Westfield, N.J., and Albert L. Remsberg, Silsbee, Tex., assignors to Mobil Oil Corporation, a corporation of New York
No Drawing. Continuation-in-part of application Ser. No. 538,604, Mar. 30, 1966. This application Dec. 13, 1966, Ser. No. 601,331
Int. Cl. C07c *51/42, 63/26*
U.S. Cl. 260—525
28 Claims

ABSTRACT OF THE DISCLOSURE

Purification of terephthalic acid by vaporizing the crude acid contaminated with impurities (p-carboxybenzaldehyde) in admixture with an inert gaseous carrier (steam) and treating the vapor mixture by contact at elevated temperatures (600–1000° F.) with particles of a solid material possessing hydrogenation activity; the presence of molecular hydrogen during the contact treatment is optional but usually preferred or molecular oxygen may be charged; and thereafter solid terephthalic acid of higher purity is condensed from the treated vapor.

---

This application is a continuation-in-part of copending application Ser. No. 538,604, filed Mar. 30, 1966 entitled "Terephthalic Acid Purification Process." It relates to the purification of crude terephthalic acid and, more particularly, to the purification of terephthalic acid containing impurities which include para-carboxybenzaldehyde.

The major impurities present in terephthalic acid prepared by catalytic oxidation of p-xylene result from incomplete oxidation. A particularly undesirable product of such incomplete oxidation is para-carboxybenzaldehyde which acts as a chain stopper during polyesterification of the terephthalic acid and, either alone or together with other by-products of the oxidation process, imparts undesirable properties to the polyester product. Accordingly, a process whereby impurities such as para-carboxybenzaldehyde can be substantially removed from crude terephthalic acid is highly desirable.

Although the process of this invention may be used for purification of terephthalic acid containing para-carboxybenzaldehyde prepared by other processes, it is especially suitable for purification of an aldehyde-containing crude terephthalic acid obtained by the catalytic oxidation of p-xylene, for example by processes of the type described in U.S. Pats. 2,833,816, 2,853,514, and 3,036,122 and others. By such processes, terephthalic acid is prepared by contacting p-xylene with a gas containing oxygen in the presence of a suitable catalyst to oxidize the methyl groups of the p-xylene to carboxylic acid groups. The process of this invention is useful for purification of crude terephthalic acid obtained directly from such a p-xylene oxidation process, e.g. a crude terephthalic acid containing up to 15,000 p.p.m. or more of para-carboxybenzaldehyde, and for purification of crude terephthalic acid from which impurities such as para-carboxybenzaldehyde have been partially removed, e.g. by leaching or washing.

In accordance with this invention impure terephthalic acid, containing impurities including para-carboxybenzaldehyde, in vaporized form in an inert carrier gas is subjected to contact with a solid surface that selectively adsorbs p-carboxybenzaldehyde from the vapor mixture and subsequent to said contact of the vapor mixture with said solid, condensing from the vapor mixture terephthalic acid having a substantially lower concentration of para-carboxybenzaldehyde than said impure terephthalic acid. More specifically, solid materials useful for practice of this invention are metals and metal compounds that possess activity as hydrogenation catalysts with preferred examples thereof being metals such as palladium, platinum, nickel and others; and, of those the Group VIII metals including palladium and platinum are particularly preferred for use in practice of this invention in generic form as well as, described more fully hereinafter, in a highly preferred aspect in which the contact of the vapor mixture comprising the vaporized terephthalic acid is carried out in presence of molecular hydrogen whereby highly effective purification is obtained while providing, as a particular advantage in continuous operation, an improvement with respect to retention of activity of the solid material.

In an embodiment, practice of this invention for purification of impure terephthalic acid comprises subjecting a crude terephthalic acid, containing impurities including para-carboxybenzaldehyde, in vaporized form in a carrier gas substantially inert to the terephthalic acid, to contact with a palladium metal surface and subsequent thereto condensing from the resulting vapor mixture terephthalic acid having a substantially lower concentration of p-carboxybenzaldehyde than the crude terephthalic acid. In a more highly preferred embodiment, and particularly for use in a continuous operation to obtain a markedly high degree of purification with extended life (activity) of the contact material, the invention relates to contacting the crude terephthalic acid, in vaporized form in a carrier gas substantially inert to the terephthalic acid, with a solid material as aforesaid that is characterized by possessing hydrogenation activity, in the presence of hydrogen and/or a free-oxygen containing gas (e.g. air, oxygen) with hydrogen being particularly preferred and, following the treatment of the terephthalic acid with the solid surface, condensing the resulting vaporous mixture and recovering from the condensate terephthalic acid of substantially reduced concentration of p-carboxybenzaldehyde than the crude terephthalic acid.

In a particularly preferred embodiment, the process of this invention comprises contacting a vaporous mixture, comprising hydrogen and crude terephthalic acid containing para-carboxybenzaldehyde, with the particulate solid that has hydrogenation activity, by dispersing the solid in the vaporous mixture, and thereafter condensing a substantial proportion of the vaporized terephthalic acid in the resulting vaporous product to provide a condensate containing terephthalic acid having a substantially lower concentration of para-carboxybenzaldehyde than the crude terephthalic acid. For practice thereof, particles of the crude terephthalic acid are entrained in a heated carrier gas and vaporized therein by sensible heat of the gas and/or by the use of supplementary heating means. For example, the solid crude terephthalic acid can be advantageously fed at approximately ambient temperature into a rapidly moving stream of carrier gas which is preheated, as for example to between about 400° and about 1000° F., and preferably to between about 600° and about 800° F. and more preferably to about 600° to about 700° F., after which the resulting gaseous stream containing entrained solid terephthalic acid can be further heated, if necessary, by passing the stream through a vaporization coil, to complete the vaporization of the solid terephthalic acid in the stream.

The carrier gas which may be used in the process of this invention can be any gas or gaseous mixture which is inert or substantially inert to terephthalic acid under the conditions of the process, which are more fully defined hereinafter. Although nitrogen is an exemplary carrier gas, steam and gaseous mixtures containing steam, for example, in an amount of up to 30 mole percent or more of the mixture, are preferred as the presence of steam generally inhibits undesirable dehydration of the terephthalic acid to its anhydride. The carrier gas can be employed in any amount which is adequate to transport the crude terephthalic acid and to provide sensible heat in a quantity which is sufficient for the desired vaporization of the terephthalic acid, or together with the heat supplied by supplementary heating means, to vaporize substantially all of the crude terephthalic acid in the carrier gas stream. Thus, when steam is used as the carrier gas, up to 50 moles or more of steam per mole of crude terephthalic acid may be used, although from 8 to 15 moles of steam per mole of crude terephthalic acid are generally adequate to provide for suitable dispersion of the acid in the carrier gas. When air is used as the free-oxygen gas, it is usually added in an amount to provide a concentration of from about 5 to 20 mole percent in the carrier gas. When oxygen is used as the free-oxygen containing gas, it is usually added in an amount to provide a concentration of oxygen substantially equivalent to that provided by the aforesaid concentration of air.

Whereas a Group VIII metal such as palladium metal or platinum metal is the solid contact surface of preference for use in practice of this invention, solids of known activity for hydrogenation have been found to be, in general, suitable for practice of this invention and, particularly, in the presence of molecular hydrogen. Examples of solids having hydrogenation activity include cobalt molybdate, nickel sulfide, nickel tungsten sulfide, tungsten disulfide, magnesium-activated copper, molybdenum sulfide, copper chromite, reduced nickel oxide, ruthenium oxide, nickel, and the chemically uncombined metals of Group VIII of the Periodic Table of the Elements. Preferably, there is used a solid material that includes a Group VIII metal which may be present in a chemically combined form of the metal (e.g. an oxide such as ruthenium oxide, a sulfide such as nickel sulfide, etc.) but which is most desirably present as the chemically uncombined metal. Thus, useful for practice of this invention are the Group VIII metals such as ruthenium, rhodium, palladium, osmium, iridium and platinum. Particularly preferred are platinum and palladium. In most cases, the palladium metal or other active component of the solid material possessing hydrogenation activity is advantageously disposed on a solid support for use in the process of this invention. Carbonaceous materials (e.g. charcoal, powdered carbon, etc.) are preferred as a solid support for the palladium metal or other active component of the surface to be contacted by the vaporized terephthalic acid, although various other supports such as alumina or silica-alumina may be used. Suitable for practice of this invention are materials that comprise the active component in an amount of from about 0.05% to about 10%, based on the total weight of the active component and support. Especially good results are realized with the use of a contact material containing from about 0.1% to about 5% by weight of palladium on a powdered carbon support.

In the process of this invention, the solid contact material may be situated in a fixed bed for contact with the vaporous mixture containing the crude terephthalic acid, or particles of the contact material can be dispersed in the vaporous mixture, e.g. by concurrent or countercurrent flow through a carrier gas stream containing the vaporized crude terephthalic acid. When the contact material is to be dispersed in such a stream, it can be added thereto in the form of fine particles which may be of any size suitable for entrainment in the stream, and which preferably have an average diameter of not more than about 600 microns. The solid material can be added to the stream by any convenient method, such as by mixing the solid particles with the crude terephthalic acid before the latter is combined with the gaseous stream, or by injecting it together with the hydrogen feed, by which the solid contact material can be advantageously contacted, preferably under pressure, prior to use in the process of this invention.

Alternatively, the particles of the contact material can be added to such a gaseous stream as a slurry containing a suitable liquid, such as water, in an amount sufficient for rendering the slurry conveniently pumpable, e.g. up to ten or more parts of liquid per part of contact material. Although the contact material can be added to the gaseous stream before, after, or as aforesaid, together with the crude terephthalic acid, best results are generally obtained if the contact material is present during vaporization of the crude terephthalic acid in the gaseous medium.

The contact material can be added to the gaseous stream in any amount sufficient to effect the desired degree of purification of the crude terephthalic acid feed. Substantial purification can usually be achieved with a feed ratio of up to 10,000 pounds or more of crude terephthalic acid per pound of contact material, although the process is generally carried out with a feed ratio of between 1200 and 7200 pounds of crude terephthalic acid per pound of contact material.

In practice of the process in presence of hydrogen, hydrogen can comprise a substantial proportion of the vaporous mixture in which the vaporized terephthalic acid is contacted with the contact material in accordance with the process of this invention. In a particularly useful embodiment of the process, the vaporized acid is contacted by the solids in the presence of at least about 10 moles, and preferably between about 50 and about 1000 moles of hydrogen per mole of para-carboxybenzaldehyde or other similar impurity present in the vaporized crude terephthalic acid. In the process embodiment wherein a vaporous mixture containing the crude terephthalic acid is contacted with the contact material by dispersing the latter in the mixture, superior results are generally obtained if the hydrogen is present, preferably together with the contact solids, during vaporization of the crude terephthalic acid. In such an embodiment, the vaporous mixture which is contacted with the contact solids can be substantially or wholly comprised of vaporized crude terephthalic acid and hydrogen, although it is generally advantageous, as pointed out hereinbefore, if an inert gas such as steam is also present in the vaporous mixture.

The temperature at which the vaporous mixture containing the crude terephthalic acid is contacted with the contact solids need not be higher than the lowest temperature required to vaporize and suitably disperse the terephthalic acid in the vaporous mixture. In general, the contact between the vaporous mixture and contact solids is carried out below about 1000° F., preferably at a temperature in excess of 600° F. up to about 750° F., and for a suitable length of time which may be varied as desired over a wide range, for example for as long as a few minutes but usually for a fraction of a second up to about 40 seconds. Highly suitable results are generally obtained at from about 0.1 to about 5 seconds, or more for the stated contact of the vaporized terephthalic acid.

Following contact between the vaporous mixture containing crude terephthalic acid and the contact solids, the resulting vaporous product is preferably filtered before it is condensed. Especially in process embodiments in which the contact solids is dispersed in the vaporous mixture, such filtration is preferred in order to insure against the presence of an undesirable residue of contact solids in the purified acid product. Any suitable filtering means can be employed for separation of contact solids or other solids from the vaporized acid, with specific types including porous metal filters, metal screen filters, ceramic mesh, etc.

It has been found that purification of terephthalic acid by the process of this invention is generally improved by the aforedescribed filtration step, especially when it is carried out with a filter on which particles of the solid contact solids accumulate in a layer through which the rate was one pound for each 4800 pounds of crude terephthalic acid and the hydrogen feed rate was varied between 52 and 83 moles per mole of para-carboxybenzaldehyde in the crude terephthalic acid, 96.3% of the terephthalic acid feed was recovered and the para-carboxybenzaldehyde concentration in the terephthalic acid was reduced by 86.2%.

EXAMPLE 7

When the procedure of Example 6 was repeated with the exception that the hydrogen feed rate was varied between 316 and 367 moles per mole of para-carboxybenzaldehyde in the crude terephthalic acid, 96.2% of the terephthalic acid feed was recovered and the para-carboxybenzaldehyde concentration in the terephthalic acid was reduced by 95.2%.

EXAMPLE 8

Solid particulate terephthalic acid containing 4500 p.p.m. of para-carboxybenzaldehyde was entrained in a conduit through which a rapidly moving stream of superheated steam having a temperature of about 600° F. and a pressure of 0.5 p.s.i.g. was passed. The stream containing the entrained acid was fed to a vaporization coil operated to vaporize substantially all of the crude terephthalic acid passing therethrough by heating the acid-containing stream to a temperature in the range of 660–690° F. Concurrently fed to the vaporization coil was a stream containing 45 moles of hydrogen per mole of para-carboxybenzaldehyde in the crude terephthalic acid fed to the coil. The resulting stream containing superheated steam, hydrogen and vaporized crude terephthalic acid was passed through a fixed bed of solid particulate 0.5% palladium on charcoal in which the vaporized terephthalic acid had a residence time of 0.53 second. Thereafter, the stream containing the vaporized terephthalic acid was condensed by combining therewith a stream of water having a temperature of about 212° F. Filtration of the condensate, which contained 2.3% of the para-carboxybenzaldehyde which had been present in the crude terephthalic acid feed, resulted in recovery of 86.4% of the terephthalic acid which had been fed to the coil.

EXAMPLE 9

The procedure of Example 8 was repeated with the exception that promoted palladium on alumina was employed as the contact solids and the hydrogen feed rate was varied between 36 and 129 moles per mole of para-carboxybenzaldehyde in the crude terephthalic acid fed to the coil. Filtration of the condensate, which contained 62.8% of the para-carboxybenzaldehyde which had been present in the crude terephthalic acid feed, resulted in recovery of 88.4% of the terephthalic acid which had been fed to the coil.

EXAMPLE 10

The procedure of Example 8 was repeated with the exception that cobalt-molybdenum was employed as the contact material and hydrogen was fed to the coil at a rate of 36 moles per mole of para-carboxybenzaldehyde in the crude terephthalic acid feed. Filtration of the condensate, which contained 65.8% of the para-carboxybenzaldehyde which had been present in the crude terephthalic acid feed, resulted in recovery of 81.8% of the terephthalic acid which had been fed to the coil.

EXAMPLE 11

The procedure of Example 8 was repeated with the exception that the crude terephthalic acid feed contained 2350 p.p.m. of para-carboxybenzaldehyde, a fixed bed of 0.5% palladium on a powdered carbon support was employed as the contact solids, the hydrogen feed rate was varied between 247 and 370 moles per mole of para-carboxybenzaldehyde in the terephthalic acid fed to the coil, and the stream containing the vaporized terephthalic acid was passed through a filter following passage through the fixed bed of contact solids and prior to condensation of the carrier stream. Filtration of the condensate, which contained 6.5% of the para-carboxybenzaldehyde which had been present in the crude terephthalic acid feed, resulted in recovery of 83% of the terephthalic acid which had been fed to the coil.

EXAMPLE 12

The procedure of Example 11 was repeated with the exception that platinum on alumina was employed as the contact solids. Filtration of the condensate, which contained 31.1% of the para-carboxybenzaldehyde which had been present in the crude terephthalic acid feed, resulted in recovery of 94.4% of the terephthalic acid which had been fed to the coil.

EXAMPLE 13

The procedure of Example 11 was repeated with the exception that the crude terephthalic acid feed contained 5250 p.p.m. of para-carboxybenzaldehyde, 0.5% palladium on a charcoal support was employed as the contact solids, and the hydrogen feed rate was varied between 31 and 332 moles per mole of para-carboxybenzaldehyde in the crude terephthalic acid fed to the coil. Filtration of the condensate, which contained 47.9% of the para-carboxybenzaldehyde which had been present in the crude terephthalic acid feed, resulted in recovery of 76.6% of the terephthalic acid which had been fed to the coil.

EXAMPLE 14

A carrier gas stream containing 33 mole percent nitrogen and 67 mole percent hydrogen was passed at a rate varying between 350 and 650 cc./min. through a stainless steel vaporization coil having a diameter of 3/8 inch and a length of 50 inches. Solid particulate terephthalic acid containing 1.5 weight percent para-carboxybenzaldehyde was simultaneously fed to the coil at a rate which averaged between 1 and 2 grams per hour. The coil was maintained under atmospheric pressure and at a temperature of 690°–700° F. to vaporize substantially all of the crude terephthalic acid passing therethrough. The resulting stream containing nitrogen, hydrogen and vaporized crude terephthalic acid was passed through a stainless steel tube having a diameter of 1/2 inch and a length of 8 inches packed with 20–25 grams of ruthenium oxide maintained at 690° F. Thereafter, the stream containing the vaporized terephthalic acid was condensed by passing the stream through an air-cooled condenser. By analysis of the terephthalic acid in the resulting condensate, it was found that the concentration of para-carboxybenzaldehyde therein had been reduced by about 44% by the procedure of this example.

The following tabulation sets forth the results obtained by practice of this invention by contacting vaporized crude terephthalic acid with a palladium metal surface, with and without addition of a free-oxygen-containing gas. The illustrative embodiments for which results are shown in the following tabulation, were carried out by passing over a period of about one hour 15 grams of crude terephthalic acid, vaporized in steam or a mixture of steam with air or oxygen, through a fixed bed containing one gram of palladium in a contact solid of 5 wt. percent Pd on charcoal, indirect cooling by means of a water condenser to totally condense solids from the resultant vapor mixture, and analysis of the condensate for concentration of p-carboxybenzaldehyde. In such runs, essentially all the terephthalic acid content of the crude terephthalic acid was recovered.

vaporized terephthalic acid must pass. Filtration of the vaporized acid through such an accumulated layer of solids often reduces the concentration of color bodies, e.g. fused-ring compounds, in the terephthalic acid, thus improving the color of the purified acid product. When such a layer of accumulated solids is employed to further purify the vaporized terephthalic acid in the vaporous mixture passing therethrough, the life (i.e. purification activity) of the contact solids in the layer has been found to be, in general, related to the particle size of the contact solids used. For example, contact solids having an average particle size within the upper portion of the range of 20 to 100 microns generally retains its activity on the filter for a significantly longer time than similarly accumulated solids of smaller particle size.

Following contact with the contact solids and preferably after separation therefrom, e.g. by the aforedescribed filtration step, the vaporized terephthalic acid in the resulting vaporous product can be separated therefrom by condensation. Although condensation of the acid can be carried out by any suitable technique, including cooling by heat exchange, it is often desirable to bring about the desired condensation by combining a cooling medium with the mixture containing the vaporized terephthalic acid. Such a cooling medium should be inert to terephthalic acid at the temperatures encountered in the present process, and is advantageously similar in nature to the inert gaseous medium used in preferred embodiments of this invention. Thus, it is generally satisfactory to employ a cooling medium containing steam or water heated to a temperature sufficiently below that of the vaporized acid and sufficient in quantity that combination thereof with the vaporous product mixture containing the terephthalic acid vapor will condense a substantial proportion of the acid vapor therein without causing undesirable condensation of other constituents of the process stream, e.g. steam, impurities which remain in vapor phase at temperatures lower than the condensation point of terephthalic acid, etc. For example, a temperature of between about 400 and about 600° F., and more specifically between 485° and 550° F. is generally preferred when condensation is carried out at approximately atmospheric pressure, although the condensation can be carried out by cooling the vaporous product mixture to any temperature which is low enough to condense terephthalic acid from the mixture. Following condensation, the solid terephthalic acid product can be separated from the cooled mixture by an appropriate method, e.g. by the use of a cyclon separator, filter or bag collector.

The terephthalic acid thus separated after contact with the contact solids as aforedescribed has been found to contain substantially decreased amounts of impurities which were present in the crude terephthalic acid before it was treated in accordance with the process of this invention. For example, concentrations of para-carboxybenzaldehyde in crude terephthalic acid have in many cases been reduced by more than 95% by the process of this invention.

The following examples are included to illustrate the effectiveness of the process of this invention in removing impurities such as para-carboxybenzaldehyde from terephthalic acid containing such impurities, and should not be regarded as indicative of limitations of the manner of carrying out the process claimed herein, as those skilled in the art will readily understand.

The following Examples 1 to 14, inclusive, illustrate practice of the invention by contacting vaporized crude terephthalic acid in presence of hydrogen with particulate solids of known types for possessing activity in hydrogenation reactions.

EXAMPLE 1

Solid particulate terephthalic acid containing 2350 p.p.m. of para-carboxybenzaldehyde was entrained in a conduit through which a rapidly moving stream of superheated steam having a temperature of about 600° F. and a pressure of 0.5 p.s.i.g. was passed. The stream containing the entrained acid was fed to a vaporization coil operated to vaporize substantially all of the crude terephthalic acid passing therethrough by heating the acid-containing stream to within the range of 660–690° F. Concurrently fed to the vaporization coil were a stream containing molecular hydrogen, at a rate varying between 247 and 556 moles of hydrogen per mole of para-carboxybenzaldehyde in the crude terephthalic acid fed to the coil, and one pound of solid particulate containing 5% palladium by weight on a charcoal support for each 200 pounds of crude terephthalic acid fed to the coil. Approximately 6.5 seconds after initial contact between the palladium-containing solids and the vaporized acid, the stream containing superheated steam, molecular hydrogen, entrained solids and vaporized terephthalic acid was passed through a filter to remove substantially all of the entrained solids. Thereafter, the filtered stream was condensed by combining therewith a stream of water having a temperature of about 212° F. Following filtration of the resulting condensate, it was found that 90.4% of the terephthalic acid feed had been recovered and that the concentration of para-carboxybenzaldehyde in the recovered terephthalic acid was 39 p.p.m. Expressed otherwise, the concentration of para-carboxybenzaldehyde in the terephthalic acid had been reduced by 98.4% by the procedure of this example.

EXAMPLE 2

When the procedure of Example 1 was repeated with the exception that the crude terephthalic acid contained 3500 p.p.m. of para-carboxybenzaldehyde, the palladium-containing solids feed rate averaging one pound for each 2850 pounds of crude terephthalic acid, and hydrogen was fed to the vaporization coil at a rate varying between 187 and 213 moles per mole of para-carboxybenzaldehyde in the crude terephthalic acid fed to the coil, 96.6% of the terephthalic acid feed was recovered and the para-carboxybenzaldehyde concentration in the terephthalic acid was reduced by 98.1%.

EXAMPLE 3

When the procedure of Example 2 was repeated with the exception that the palladium-containing solids feed rate was one pound for each 2400 pounds of crude terephthlic acid and the hydrogen feed rate was varied between 52 and 249 moles per mole of para-carboxybenzaldehyde in the crude terephthalic acid, 96% of the terephthalic acid feed was recovered and the para-carboxybenzaldehyde concentration in the terephthalic acid was reduced by 94%.

EXAMPLE 4

When the procedure of Example 3 was repeated with the exception that the hydrogen feed rate was varied between 41 and 187 moles per mole of para-carboxybenzaldehyde in the crude terephthalic acid fed to the coil, and the vapor product from the coil was directly passed to the condensation step, 98.7% of the terephthalic acid feed was recovered and the para-carboxybenzaldehyde concentration in the terephthalic acid was reduced by 79.1%.

EXAMPLE 5

When the procedure of Example 3 was repeated with the exception that hydrogen was fed to the vaporization coil at a rate which varied between 23 and 52 moles per mole of para-carboxybenzaldehyde in the crude terephthalic acid fed to the coil, 94.7% of the terephthalic acid feed was recovered and the para-carboxybenzaldehyde concentration in the terephthalic acid was reduced by 83%.

EXAMPLE 6

When the procedure of Example 3 was repeated with the exception that the palladium-containing solids feed

| Run No.: | Ratio of steam: TPA, mole | Residence time, seconds | Added air or oxygen concn. in steam | Temp., °F. | Pressure, p.s.i.g. | P-carboxy- benzaldehyde content of crude terephthalic acid, p.p.m. | P-carboxy- benzaldehyde content of condensate, p.p.m. | Decrease in p- carboxy- benzalde- hyde content, percent |
|---|---|---|---|---|---|---|---|---|
| 1 | 60:1 | 0.4 | None | 700 | 1 | 8,705 | 35 | 99.5 |
| 2 | 60:1 | 0.4 | do | 700 | 1 | 1,180 | 55 | 95 |
| 3 | 60:1 | 0.4 | 4 mole percent $O_2$ | 700 | 3 | 1,180 | 180 | 84 |
| 4 | 60:1 | 0.4 | 11 mole percent air | 700 | 3 | 24,000 | 1,800 | 92 |
| 5 | 60:1 | 0.4 | do | 700 | 3 | 1,180 | 65 | 94 |
| 6 | 60:1 | 0.4 | 2.4 mole percent $O_2$ | 700 | 3 | 1,180 | 83 | 93 |

In still another run, impure terephthalic acid containing 8700 parts/million of p-carboxybenzaldehyde was conveyed by steam through a furnace at a temperature of 700° F. and atmospheric pressure whereby the acid was vaporized. The acid concentration in the steam-acid vapor mixture was 2.0 mole percent. The vapor mixture was passed downwardly through a fixed bed of palladium-on-alumina (0.05 wt. percent Pd) for a residence time of 0.5 second and the exiting gases flowed to a line condenser that reduced the temperature to 500° F. by injection of cooling steam. Particles of terephthalic acid that condensed were separated in a cyclone and, upon analysis, had a 99% decreased content of para-carboxybenzaldehyde concentration as compared to the impure feed acid. For such an embodiment, the effectiveness of the palladium-containing bed can be maintained by subjecting the bed to regeneration cycles with a steam-air mixture (e.g. 11 mole percent air) at 700° F. substantially atmospheric pressure and a residence time of about 0.5 second. The need for regeneration cycles may be markedly decreased by addition of a free-oxygen-containing gas to the steam or other suitable carrier gas in which the impure terephthalic acid is vaporized as the presence of free oxygen is believed to react with the p-carboxybenzaldehyde taken up by the palladium and, possibly, convert the aldehyde to terephthalic acid.

In still other runs, impure terephthalic acid (TPA) was treated as embodied herein with a contact material comprising nickel on kieselguhr, specifically Harshaw Ni–0104P, 58% nickel on kieselguhr pretreated at 400° F. for 90 minutes with a 40% $H_2$-steam mixture. The runs were carried out by passing impure terephthalic acid, containing 8705 parts/million (p.p.m.) of p-carboxybenzaldehyde (PCB) over a fixed bed of that contact material mixed with glass beads with the vaporous stream thus contacted comprising a mole ratio of steam:terephthalic acid of about 60:1 with and without added hydrogen. The contact with the solid material was at 700° F., 1 p.s.i.g., and for about 0.5 second residence time. The following tabulation sets forth results obtained by condensing the terephthalic acid resulting from such treatment.

| Run No.: | Ratio of Ni:glass beads | $H_2$ concn. in vapor mixture | PCB content in feed, p.p.m. | PCB content of TPA product | Percent decrease in PCB content |
|---|---|---|---|---|---|
| 1 | 1 gram/96 grams | 5 mole percent | 8,705 | 4,231 | 51 |
| 2 | 2 grams/96 grams | 10 mole percent | 8,705 | 4,074 | 53 |
| 3 | 4 grams/96 grams | do | 8,705 | 3,611 | 60 |
| 4 | do | do | 8,705 | 3,056 | 65 |
| 5 | 1 gram/96 grams | 0 mole percent | 8,705 | 6,031 | 31 |

Although it is not intended to be bound by any theory as to the reasons underlying the effectiveness of the process embodied herein, it appear that in the use of a suitable contact material in the presence of hydrogen, the undesired aldehyde impurity is removed by adsorption by the contact surface and in the use of hydrogen, the hydrogen functions to convert the aldehyde to derivatives more readily separable from the terephthalic acid and to maintain activity of the contact material in the process embodied herein.

Although the process of this invention has been illustrated with preferred embodiments, it is to be understood that modifications and variations may be employed without departing from the spirit and scope of this invention, as those skilled in the art will readily understood. Such variations and modifications are therefore considered to be within the purview and scope of the appended claims.

We claim:

1. A process for purification of crude terephthalic acid which comprises contacting a vaporous mixture, comprising crude terephthalic acid containing para-carboxybenzaldehyde and a gaseous medium substantially inert to terephthalic acid, with a solid material which comprises a Group VIII metal possessing hydrogenation activity and thereafter condensing at least a substantial portion of the terephthalic acid from the resulting vapor mixture to provide a condensate containing terephthalic acid of substantially lower content of said aldehyde than said crude terephthalic acid.

2. A process, as defined in claim 1 in which said solid is a metal selected from the group consisting of palladium, platinum and nickel on an inert solid support.

3. A process, as defined in claim 1, in which the contact of the vapor mixture containing the vaporized crude terephthalic acid is carried out in the presence of at least one member from the group consisting of molecular hydrogen and free oxygen.

4. A process, as defined in claim 1, in which the gaseous medium contains free oxygen in an amount corresponding to from about 5 to about 20 mole percent air.

5. A process, as defined in claim 1, in which said solid material comprises platinum disposed on a carbonaceous support.

6. A process, as defined in claim 1, in which the vaporous mixture containing the vaporized crude terephthalic acid is passed into contact with a fixed bed of particulate solids comprising palladium metal on an inert support.

7. A process for purification of crude terephthalic acid which comprises vaporizing crude terephthalic acid, containing para-carboxybenzaldehyde as an impurity, in an inert gas medium comprising steam, contacting the resulting vapor mixture comprising steam and the vaporized crude terephthalic acid with a fixed bed of particulate solids comprising palladium metal on an inert support at a temperature of from about 600° F. to about 750° F. and a residence time of from about 0.1 to about five seconds, and condensing at least a substantial portion of the terephthalic acid in the resulting vapor mixture as condensed terephthalic acid substantially more pure than said crude terephthalic acid.

8. A process, as defined in claim 7, in which the inert gaseous medium comprises a free oxygen-containing gas.

9. A process for the purification of crude terephthalic acid which comprises contacting a vaporous mixture, comprising crude terephthalic acid containing para-carboxybenzaldehyde and a gaseous medium substantially inert to terephthalic acid, with a solid material which comprises a Group VIII metal possessing activity as a hydrogenation catalyst, in the presence of hydrogen, and thereafter condensing a substantial proportion of the vaporized terephthalic acid in the resulting vaporous product to provide a condensate containing terephthalic acid having a substantially lower concentration of para-carboxybenzaldehyde than the crude terephthalic acid.

10. A process, as defined in claim 9, in which the gaseous medium comprises steam.

11. A process, as defined in claim 9, in which the solid material is dispersed in the vaporous mixture.

12. A process, as defined in claim 9, in which the vaporous mixture is contacted with a fixed bed of the solid material.

13. A process, as defined in claim 9, in which said solid material comprises platinum disposed on an inert solid support.

14. A process, as defined in claim 9, in which the solid material comprises platinum on a carbonaceous support.

15. A process, as defined in claim 9, in which the solid material comprises palladium on a carbonaceous support.

16. A process, as defined in claim 9, in which the vaporous mixture is contacted with the solid material in the presence of from about 50 to about 1000 moles of hydrogen per mole of para-carboxybenzaldehyde present in the crude terephthalic acid.

17. A process, as defined in claim 9, in which the contact of the vaporous mixture with the solid material is carried out at a temperature between about 600° and about 1000° F.

18. A process, as defined in claim 9, in which the vaporous mixture is contacted with the solid material for about 0.1 to 40 seconds.

19. A process for the purification of crude terephthalic acid which comprises contacting a vaporous mixture comprising hydrogen and crude terephthalic acid containing para-carboxybenzaldehyde, with a solid material which comprises a Group VIII metal possessing hydrogenation activity by dispersing the solid material in the vaporous mixture, and thereafter condensing a substantial proportion of the vaporized terephthalic acid in the resulting vaporous product to provide a condensate containing terephthalic acid having a substantially lower concentration of para-carboxybenzaldehyde than the crude terephthalic acid.

20. A process, as defined in claim 19, in which the vaporous mixture comprises a gaseous medium substantially inert to terephthalic acid.

21. A process, as defined in claim 19, in which the vaporous mixture comprises steam.

22. A process, as defined in claim 19, in which said solid material comprises platinum disposed on an inert solid support.

23. A process, as defined in claim 19, in which the solid material comprises platinum on a carbonaceous support.

24. A process, as defined in claim 19, in which the solid material comprises palladium on a carbonaceous support.

25. A process, as defined in claim 19, in which, following contact of the vaporous mixture with the solid material, the solid material is separated from the resulting vaporous product by passage of said product through a filter means on which particles of the solid material accumulate.

26. A process, as defined in claim 19, in which the vaporous mixture comprises from about 50 to about 1000 moles of hydrogen per mole of para-carboxybenzaldehyde present in the crude terephthalic acid in the mixture.

27. A process, as defined in claim 19, in which the contact of the vaporous mixture with the solid material is carried out at a temperature between about 600° and about 1000° F.

28. A process, as defined in claim 19, in which the vaporous mixture is contacted with the solid material for about 0.1 to 40 seconds.

References Cited

UNITED STATES PATENTS

| 3,265,729 | 8/1966 | Olsen et al. | 260—525 |
| 3,330,863 | 7/1967 | Read et al. | 260—525 |

FOREIGN PATENTS

| 994,769 | 6/1965 | Great Britain. |

LORRAINE A. WEINBERGER, Primary Examiner

R. S. WEISSBERG, Assistant Examiner